United States Patent
Eck et al.

(12) 
(10) Patent No.: US 6,228,937 B1
(45) Date of Patent: May 8, 2001

(54) CROSSLINKABLE POWDER COMPOSITION WHICH IS REDISPERSIBLE IN WATER

(75) Inventors: Herbert Eck, Bad Toelz; Theo Mayer, Haiming; Hans-Peter Weitzel, Reischach, all of (DE)

(73) Assignee: Wacker Chemie GmbH, Munich (DE)

( * ) Notice: Subject to any disclaimer, the term of this patent is extended or adjusted under 35 U.S.C. 154(b) by 0 days.

(21) Appl. No.: 09/507,655

(22) Filed: Feb. 22, 2000

Related U.S. Application Data

(63) Continuation of application No. 09/126,677, filed on Jul. 30, 1998, now abandoned.

(30) Foreign Application Priority Data

Jul. 31, 1997 (DE) .............................................. 197 33 156

(51) Int. Cl.$^7$ ..................................................... C08G 63/48

(52) U.S. Cl. ............................................. 525/57; 524/503

(58) Field of Search ................................. 525/57; 524/503

(56) References Cited

U.S. PATENT DOCUMENTS

| | | | | |
|---|---|---|---|---|
| 4,542,178 | * | 9/1985 | Zimmermann | 524/388 |
| 4,735,986 | * | 4/1988 | Iacoviello | 524/427 |
| 5,608,011 | * | 3/1997 | Eck | 525/344 |
| 5,741,833 | * | 4/1998 | Seyama | 523/205 |

* cited by examiner

*Primary Examiner*—Paul R. Michl
(74) *Attorney, Agent, or Firm*—Burgess, Ryans & Wayne; Milton J. Wayne; William R. Moran

(57) ABSTRACT

A crosslinkable powder composition is provided which is redispersible in water and comprises
a) from 30 to 95 parts by weight of a water-insoluble, film-forming polymer of one or more free-radically polymerizable, ethylenically unsaturated monomers,
b) from 5 to 70 parts by weight of a water-soluble polymer, where at least one of the polymer components a) and b) comprises one or more comonomer units containing reactive groups which can form a chemical, nonionic bond with one another or with crosslinkers, and the parts by weight of a) and b) add up to 100 parts by weight, and
c) from 0.01 to 5% by weight, based on the total weight of a) and b), of at least one phase transfer catalyst.

4 Claims, No Drawings

CROSSLINKABLE POWDER COMPOSITION WHICH IS REDISPERSIBLE IN WATER

This application is a continuation of U.S. application Ser. No. 09/126,677, filed Jul. 30, 1998, abandoned, the entire content of which is incorporated by reference.

BACKGROUND OF THE INVENTION

1) Field of the Invention

The invention relates to a crosslinkable powder composition which is redispersible in water and also to its use.

2) Background Art

EP-A 601518 describes crosslinkable dispersion powders which are redispersible in water and based on carboxyl-containing acrylate copolymers which are dried in the presence of polyvinyl alcohol and can contain polyvalent metal ions for crosslinking. Similar crosslinkable dispersion powders are also known from U.S. Pat. No. 3,409,578 in which powder compositions comprising carboxyl-containing polymers and/or carboxyl-containing protective colloids are crosslinked in the presence of polyvalent metal ions A disadvantage is that such compositions comprising polyvalent metal salts often liberate acid in the presence of water and tend to crosslink prematurely, especially in contact with moisture.

To avoid premature crosslinking, EP-A 702059 (U.S. Pat. No. 5,608,011) proposes using crosslinkable dispersion powders comprising N-methylol-containing copolymers and a catalyst combination of water-soluble or water-dispersible peroxo acid salts or reducing agents. EP-B 687317 describes crosslinkable powders which are redispersible in water and are based on N-methylol-functional copolymers which crosslink on heating. A disadvantage of the latter powder is the fact that exclusively heat-crosslinkable powders cannot be used in many applications.

EP-A 723975 discloses crosslinkable dispersion powders based on copolymers containing epoxide groups. For crosslinking, external crosslinkers such as polyamines, polycarboxylic acids, hydroxy-functionalized polymers and polyvalent metal salts are added. A problem with the use of polyamines or polyvalent metal salts is the low storage stability. The use of polycarboxylic acid or hydroxy-functionalized polymers does not impair the storage stability; however, elevated temperatures have to be employed for the reaction with the epoxy groups since otherwise the stabilization, as indicated in the application, of the dispersion powders by customary protective colloids would not be possible.

EP-A 721004 discloses crosslinkable, redispersible powder mixtures which comprise film-forming polymer particles having at least one functional, crosslinkable group. The crosslinkable group can also be introduced via the protective colloids. For crosslinking, this document, too, recommends the addition of an external crosslinker comprising at least one reactive component which forms nonionic bonds with the functional groups after the mixture is redispersed in water.

It is an object of the invention to provide a crosslinkable polymer powder composition which is redispersible in water and has good storage stability and offers the opportunity of matching the crosslinking rate to the respective field of application. A further object of the invention 1s to make available crosslinkable dispersion powders which can be crosslinked without addition of external crosslinkers.

SUMMARY OF THE INVENTION

This is surprisingly achieved by the use of phase transfer catalysts in admixture with crosslinkable polymers, where the functlonalities of the protective colloids present in redispersible powders can also be exploited for crosslinking.

The invention provides a crosslinkable powder composition which is redispersible in water and comprises a) from 30 to 95 parts by weight of a water-insoluble, film-forming polymer of one or more free-radically polymerizable, ethylenically unsaturated monomers, b) from 5 to 70 parts by weight of a water-soluble polymer, where at least one of the polymer components a) and b) comprises one or more comonomer units containing reactive groups which can form a chemical, nonionic bond with one another or with crosslinkers, and the parts by weight of a) and b) add up to 100 parts by weight, and c) from 0.01 to 5% by weight, based on the total weight of a) and b), of at least one phase transfer catalyst.

DESCRIPTION OF THE PREFERRED EMBODIMENTS

Suitable water-insoluble, film-forming polymers comprise one or more monomer units selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes such as butadiene or isoprene, olefins such as ethene or propene, vinylaromatics such as styrene, methylstyrene or vinyltoluene, and vinyl halides such as vinyl chloride. For the purposes of the present invention, water-insoluble means that the solubility of the polymers under normal conditions is less than 1 g per liter of water. For film formation, the polymer composition is generally selected such that film formation occurs at the processing temperature, preferably such that a glass transition temperature Tg of from $-30°$ C. to $+80°$ C. results.

Preferred vinyl esters are vinyl acetate, vinyl propionate, vinyl butyrate, vinyl 2-ethylhexanoate, vinyl laurate, 1-methylvinyl acetate, vinylpivalate and vinyl esters of alpha-branched monocarboxylic acids having from 5 to 11 carbon atoms, for example VeoVa9$^R$ or VeoVa10 (trade names of Shell). Particular preference is given to vinyl acetate.

Preferred methacrylic or acrylic esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate. Particular preference is given to methyl acrylate, methyl methacrylate, n-butyl acrylate and 2-ethylhexyl acrylate.

Preferred ester groups of fumaric and maleic acids are methyl, ethyl, n-propyl, iso-propyl, n-butyl, iso-butyl, t-butyl, hexyl, ethylhexyl and dodecyl groups.

Monomer units in the polymer a) and/or b) which are suitable for crosslinking reactions are those which contain crosslinkable groups which undergo accelerated crosslinking in the presence of phase transfer catalysts. These are generally functional groups which crosslink with one another or with other functional groups by means of nucleophilic substitution reactions, condensation reactions or addition reactions. From this, it is possible to deduce the reactive groups which are suitable for the crosslinking reactions and may be present in the water-insoluble polymer a) and/or in the water-soluble protective colloid b).

In the water-insoluble polymer a), the crosslinkable groups are preferably incorporated by copolymerization of monomers containing the desired functional groups.

However, appropriately substituted comonomer units can also be functionalized subsequently.

Monomers suitable for crosslinking via condensation reactions are alkoxysilane-functional monomer units such as acryloxypropyltri(alkoxy)silanes and methacryloxypropyltri(alkoxy)silanes, vinyltrialkoxysilanes and vinylmethyldialkoxysilanes; alkoxy groups which may be present are, for example, methoxy, ethoxy, methoxyethylene, ethoxyethylene, methoxypropylene glycol ether and eLhoxypropylene glycol ether radicals. Preference is given to vinyltriethoxysilane and gamma-methacryloxypropyltriethoxysilane.

Further examples of comonomers which can be crosslinked by a condensation reaction are acrylamidoglycolic acid (AGA), methyl methacrylamidoglycolate (MMAG), N-methylolacrylamide (NMAA), N-methylolmethacrylamide, N-methylolallyl carbamate, alkyl ethers of N-methylolacrylamide or N-methylolmethacrylamide, e.g. their isobutoxy ethers or n-butoxy ethers.

Comonomers which can be crosslinked by means of addition reactions are comonomers containing epoxide groups, for example glycidyl acrylate, glycidyl methacrylate, glycidyl vinyl ether and glycidyl allyl ether, and isocyanate monomers such as meta- and para-isopropenyl-alpha, alpha-dimethylbenzyl isocyanate (TMI), 2-methyl-2-isocyanatopropyl methacrylate; the isocyanate groups of the monomers mentioned may also, if desired, be blocked, for example by means of phenol, salicylic esters, ketoxime, caprolactam, dialkyl malonates, alkyl acetoacetates, 2,2-dimethyl-1,3-dioxane-4,6-dione. Examples of anhydride comonomers are allylsuccinic anhydride and maleic anhydride.

Further examples of crosslinkable comonomers are hydroxyl-containing comonomers such as hydroxyalkyl acrylates and methacrylates which may, if desired, be acetoacetylated, e.g. hydroxyethyl (meth)acrylate, hydroxypropyl (meth)acrylate and hydroxybutyl (meth)acrylate. Also suitable are carboxyl- or sulfo-functional comonomers such as vinylsulfonic acid, acrylic, methacrylic, maleic, fumaric, crotonic and itaconic acids, the monoesters of maleic and fumaric acids, monovinyl succinate and methylenemalonic acid.

Examples of crosslinkable monomer units containing carbonyl groups are vinyl or allyl acetoacetate, vinyl or allyl bisacetoacetate and acrolein. Examples of crosslinkable monomer units containing amine groups are allylamine, 2-aminoethyl (meth)acrylate, compounds containing hydrazide groups, e.g. the hydrazides of acrylic acid and crotonic acid. Also suitable are compounds containing reactive halogen atoms, e.g. vinyl or allyl chloroacetate, chloromethylstyrene, allyl chloride or allyl bromide, vinylidene chloride.

The crosslinkable monomer units are generally present in an amount of from 0.1 to 10% by weight, preferably from 0.5 to 5% by weight, in each case based on the total weight of the polymer a).

Preferred crosslinkable monomer units are glycidyl (meth)acrylate, meta- and para-isopropenyl-alpha,alpha-dimethylbenzyl isocyanate (TMI), allyl acetoacetate, unmodified or acetoacetylated hydroxyethyl (meth)acrylate or hydroxypropyl (meth)acrylate, acrylamidoglycolic acid (AGA), methyl methacrylamidoglycolate (MMAG), N-methylolacrylamide (NMA), acrylic, methacrylic, maleic, fumaric, crotonic and itaconic acids.

Other suitable auxiliary monomers are multiply ethylenically unsaturated comonomers such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

As polymers a) which comprise the crosslinkable comonomer units mentioned in the amounts indicated, preference is given to:
from the group consisting of vinyl ester polymers vinyl acetate polymers;
vinyl ester-ethylene copolymers such as vinyl acetate-ethylene copolymers having an ethylene content of from 1 to 60% by weight;
vinyl ester-ethylene-vinyl chloride copolymers having an ethylene content of from 1 to 40% by weight and a vinyl chloride content of from 20 to 90% by weight in which vinyl esters present are preferably vinyl acetate and/or vinyl propionate and/or one or more copolymerizable vinyl esters such as vinyl laurate, vinyl pivalate, vinyl 2-ethylhexanoate, vinyl esters of alpha-branched carboxylic acids, in particular the vinyl ester of versatic acid;
vinyl acetate copolymers with from 1 to 50% by weight of one or more copolymerizable vinyl esters such as vinyl laurate, vinyl pivalate, vinyl 2-ethylhexanoate, vinyl esters of alpha-branched carboxylic acids, in particular vinyl esters of versatic acid (VeoVa9®, VeoVa10®), which may further comprise from 1 to 40% by weight of ethylene;
vinyl ester-acrylic ester copolymers comprising from 30 to 90% by weight of vinyl ester, in particular vinyl acetate, and from 1 to 60% by weight of acrylic ester, in particular n-butyl acrylate or 2-ethylhexyl acrylate, which may further comprise from 1 to 40% by weight of ethylene;
vinyl ester-acrylic ester copolymers comprising from 30 to 75% by weight of vinyl acetate, from 1 to 30% by weight of vinyl laurate or a vinyl ester of an alpha-branched carboxylic acid, in particular the vinyl ester of versatic acid, from 1 to 30% by weight of acrylic ester, in particular n-butyl acrylate or 2-ethylhexyl acrylate, which may further comprise from 1 to 40% by weight of ethylene;
vinyl ester copolymers with esters of maleic acid or fumaric acid, e.g. the diisopropyl, di-n-butyl, di-t-butyl, di(ethylhexyl) and methyl t-butyl esters, for example vinyl acetate copolymers with from 10 to 60% by weight of one or more of the maleic/fumaric esters mentioned, which may further comprise ethylene or further copolymerizable vinyl esters such as vinyl laurate or the vinyl ester of versatic acid.
From the group consisting of (meth)acrylic polymers polymers of n-butyl acrylate or 2-ethylhexyl acrylate; copolymers of methyl methacrylate with n-butyl acrylate and/or 2-ethylhexyl acrylate are preferred.
From the group consisting of vinyl chloride polymers, apart from the abovementioned vinyl ester-vinyl chloride-ethylene copolymers, vinyl chloride-ethylene copolymers and vinyl chloride-acrylate copolymers are preferred.
From the group consisting of styrene polymers styrene-butadiene copolymers and styrene-acrylic ester copolymers such as styrene-n-butyl acrylate or styrene-2-ethylhexyl acrylate, each having a styrene content of from 1 to 70% by weight are preferred.

Water-soluble polymers b) used are water-soluble protective colloids which may, if desired, be functionalized by hydroxyl groups, mercapto groups, carboxyl groups, amine groups or carbonyl groups. For the purposes of the present invention, water-soluble means that the solubility under normal conditions is more than 10 g per liter of water. Suitable protective colloids are commercially available. If the functional groups are not already present in the protective colloids, the latter can also be functionalized subsequently. Polyvinyl alcohols functionalized by mercapto groups, carboxyl groups, amine groups or carbonyl groups are also obtainable by copolymerization of correspondingly functionalized comonomers with vinyl acetate and subsequent hydrolysis in a manner known to those skilled in the art.

Examples of suitable protective colloids are polyvinyl alcohols comprising from 75 to 100 mol %, preferably from 78 to 95 mol %, of vinyl alcohol units and having a molecular weight of preferably from 5000 to 200000; polyvinylpyrrolidones having a K value of from 10 to 120; polysaccharides in water-soluble form, e.g. starches (amylose and amylopectin), celluloses and their carboxymethyl, methyl, hydroxyethyl and hydroxypropyl derivatives; proteins such as casein, soya protein and gelatin; lignosulfonates; synthetic polymers such as poly(meth)acrylic acid, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers.

As polymers b), preference is given to the abovementioned polyvinyl alcohols, starches, celluloses, casein, melamine-formaldehyde sulfonates, naphthalene-formaldehyde sulfonates and, from the group consisting of functionalized protective colloids, polyvinyl alcohols functionalized by carboxyl groups, acetoacetyl groups or amino groups and carboxymethyl-substituted starches and celluloses.

The water-soluble polymers b) mentioned can be added as protective colloids during the polymerization of the polymer a) or added as a spraying aid before spraying of the aqueous dispersion of the polymer a), or partly during the polymerization and the remainder before spraying.

Typical examples of phase transfer catalysts are described in Ullmann, Encyclopedia of industrial Chemistry, Vol. 19A, pp. 294–295 (1991). Suitable compounds are, for example: quaternary ammonium salts such as tetrabutylammonium, benzyltrimethylammonium, benzyltriethylammonium, methyltributylammonium and methyltrioctylammonium salts; quaternary phosphonium salts such as tetrabutylphosphonium salts; quaternary pyridinium salts such as N-(2-ethylhexyl)-4-(N',N'-dimethylamino)pyridinium salts. In general, these salts are in the form of halides, for example chloride or bromide, or sulfate or acetate. Other suitable phase transfer catalysts are crown ethers such as 18—crown-6, dibenzo-18-crown Kryptofix (2.2.2), tris[2-(2-methoxyethoxy)ethyl]amine, polyethers such as polyethylene glycols (PEG 1000, PEG 2000) or tris(dioxa-3,6-heptyl) amine (TDA-1), also polyethylene glycol dialkyl ethers, polyethylene glycol aryl aralkyl ethers such as TritonpCF10, polyethylene glycol alkyl aryl ethers and tertiary diamines or oligoamines suitable for complex formation, e.g. N,N,N',N'-tetramethylethylenediamine.

The water-insoluble polymers a) are preferably prepared using the emulsion polymerization process. This is carried out in an open reaction vessel or in pressure vessels in a temperature range from 0° C. to 100° C. and is initiated using the methods customarily employed for emulsion polymerization. Initiation is carried out by means of the customary, at least partially water-soluble free-radical formers which are preferably used in amounts of from 0.01 to 3.0% by weight, based on the total weight of the monomers. Examples are sodium persulfate, hydrogen peroxide, t-butyl peroxide, t-butyl hydroperoxide; potassium peroxodiphosphate, azobisisobutyronitrile. If desired, the free-radical initiators mentioned can also be combined in a known manner with from 0.01 to 0.5% by weight of reducing agents, based on the total weight of the monomers. Suitable reducing agents are, for example, alkali metal formaldehydesulfoxylates and ascorbic acid. In the redox initiation, one or both redox catalyst components are preferably metered in during the polymerization.

As dispersants, it is possible to use all emulsifiers customarily employed in emulsion polymerization. Suitable emulsifiers include anionic, cationic and also nonionic emulsifiers. The emulsifiers are preferably used in an amount of up to 3% by weight, based on the total weight of the monomers. Examples of suitable emulsifiers are anionic surfactants such as alkyl sulfates having a chain length of from 8 to 18 carbon atoms, alkyl ether sulfates and alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, esters and monoesters of sulfosuccinic acid with monohydric alcohols or alkylphenols. Suitable nonionic surfactants are, for example, alkyl polyglycol ethers or alkylaryl polyglycol ethers having from 8 to 40 ethylene oxide units.

The preparation is preferably carried out in the presence of the abovementioned protective colloids. The pH range desired for the polymerization, which is generally from 2.5 to 10, preferably from 3 to 8, can be set in a known manner by means of acids, bases and customary buffer salts such as alkali metal phosphates or alkali metal carbonates. To set the molecular weight, the customary regulators, for example mercaptans, aldehydes and chlorinated hydrocarbons, can be added in the polymerization.

The polymerization can, regardless of the polymerization process selected, be carried out batchwise or continuously, with or without use of seed latices, with initial charging of all or some constituents of the reaction mixture, or with partial initial charging and further metering in of some or all constituents of the reaction mixture, or by the feed stream addition process without an initial charge. The solids content of the dispersion obtainable in this way is from 20 to 70%. The mean particle size is from. 0.1 to 10 $\mu$m, preferably from 0.2 to 5 $\mu$m.

The drying of the dispersion can be carried out by means of spray drying, freeze drying or fluidized-bed drying. Preference is given to spray drying in customary spray drying units, where atomization can be carried out by means of single-fluid, two-fluid or multifluid nozzles or using a rotary atomizer disk. The outlet temperature is generally selected so as to be in the range from 55° C. to 100° C., preferably from 65° C to 90° C., depending on the unit, the Tg of the resin and the desired degree of drying.

For spray drying, the dispersion of the polymer a) having a solids content of preferably from 20% to 60% is sprayed together with protective colloids as spraying aid and dried. Protective colloids used here can be the abovementioned water-soluble polymers b) and can be added to the aqueous dispersion before spray drying, in the form of an aqueous solution. In this process step, preference is given to adding from 5 to 20% by weight of water-soluble polymer b), based on polymer a).

In general, the phase transfer catalysts c) are mixed in after the drying procedure, preferably in solid form. If liquid catalysts are to be used, these can, for example, be adsorbed onto solids surfaces and used in that form or can be sprayed onto the dry powder.

Owing to the presence of phase transfer catalysts, the crosslinking of the polymer a) containing reactive groups and/or of the functionalized protective colloid b) can be accelerated using external crosslinkers. Accordingly, conventional crosslinkers are also possible as further constituents of the powder composition.

Suitable crosslinkers are diamines, oligoamines and polyamines such as diaminobutane, hexamethylenediamine, polyalkyleneamines such as triethylenetetramine; dicarboxylic, oligocarboxylic and polycarboxylic acids such as adipic acid, polyacrylic acid; compounds containing two or more alcohol groups, e.g. ethylene glycol, butanediol, pentaerythritol, polytetramethylene glycol, bisphenol A, polyalkylene oxide adducts of ethylene glycol; compounds containing two or more silanol or alkoxysilane groups, e.g. methyltriethoxysilane in monomeric or condensed form; diisocyanates, oligoisocyanates or polyisocyanates in free or blocked form, e.g. toluene diisocyanate, isophorone diisocyanate, dimethyl-meta-isopropenylbenzyl isocyanate; polyvalent metal ions such as aluminum chloride, iron(III) chloride or zinc chloride. Also suitable are compounds containing two or more groups selected from among epoxide, aldehyde, keto and reactive CH groups, e.g. glutaraldehyde, terephthalic dialdehyde; bisacetoacetates of ethylene glycol, propylene glycol, butylene glycol, hexadiene glycol; organic halogen compounds such as trichlorotriazine or dichloroacetic esters of alkylene glycols; compounds containing a plurality of aziridine, carbodiimide or oxazoline groups, and also amine formaldehydes. The crosslinkers can be used in an amount of from 1 to 10 molar equivalents per crosslinkable group in the polymers a) or b).

If desired, the powder composition can also be modified by means of further additives. Examples of these are antiblocking agents, dyes, pigments, plasticizers, film forming aids, antifoams, catalysts, rheology improvers, thickeners, coupling agents and emulsifiers; if these are liquid in the original state, they have to be converted into a pulverulent state before being mixed in.

The dispersion powder composition can be used in typical fields of application for such powders, for example in chemical building products in combination with inorganic, hydraulically setting binders such as cements (Portland, alumina, pozzolanic, slag, magnesia or phosphate cement), plaster of Paris, water glass, for the production of building adhesives, plasters and renders, knifing fillers, screeds, jointing mortars and paints. It can also be used as sole binder for coating compositions and adhesives or as binder for textiles and paper. The dispersion powder composition is preferably used as binder in fields of application in which not only good adhesion but also reduced water absorption and/or good solvent resistance are desired.

The redispersion powders of the invention are products which readily redisperse in water and, when used in powder form or as aqueous dispersion, form mechanically strong, crosslinked films which are no longer redispersible in water. Crosslinking occurs under milder conditions and is more complete than when no catalyst is added. Surprisingly, the storage stability was not drastically reduced by addition of phase transfer catalysts, but remained stable. It was also surprising that the blocking stability was not measurably influenced by the often hygroscopic catalysts. The great advantage of the composition of the invention is that it makes available a single-component system as crosslinkable dispersion powder composition to which, in contrast to the 2-component systems of the prior art, no external crosslinkers have to be added. In the embodiment as a 2-component system with an additional crosslinker, the crosslinking reaction can be accelerated by the use of the phase transfer catalyst, with the result that thermal crosslinking occurs at a significantly lower temperature level.

The following examples illustrate the invention:

EXAMPLE 1

A 16 l stirring autoclave was charged with 3420 g of water, 352 g of polyvinyl alcohol having a Höppler viscosity of 4 mPas (4% strength solution in water at 20° C.) and a saponification number of 140, 50 g of dodecylbenzenesulfonate (15% strength in water), 510 g of vinyl acetate and 200 g of ethylene and the mixture was heated to 50° C. The catalyst solutions, a 6% strength aqueous solution of sodium persulfate and a 3% strength aqueous solution of sodium formaldehydesulfoxylate, were then fed in. After the polymerization had started, the monomer feed stream comprising 2800 g of vinyl acetate and 120 g of glycidyl methacrylate was fed in. During the polymerization, a further 800 g of ethylene were injected. After the metering-in time of about 5 hours, polymerization was continued for another 2 hours.

The solids content of the dispersion was 51%. The polymer had a K value of 74.5, a $T_g$ of 40° C. and an MFT of 0° C.

Before spraying, 8.1% by weight, based on polymer, of polyvinyl alcohol having a Höppler viscosity of 13 mPas (4% strength solution in water at 20° C.) and a saponification number of 140 plus 0.8% by weight, based on polymer, of polyvinyl alcohol having a Höppler viscosity of 5 mPas (4% strength solution in water at 20° C.) and a saponification number of 140 were added in the form of aqueous solutions. The solids content of the mixture to be sprayed was 35% by weight. Drying was carried out in a Nubilosa spray dryer at an outlet temperature of 82° C. and a compressed air pressure upstream of the 2-fluid nozzle of 4 bar.

EXAMPLE 2

A 16 l stirring autoclave was charged with 2000 g of water and 487 g of polyvinyl alcohol having a Höppler viscosity of 4 mPas (4% strength solution in water at 20° C.) and a saponification number of 140, the mixture was heated to 50° C. and ethylene was injected to a pressure of 60 bar. This pressure was maintained during the entire time over which the monomers were metered. The catalyst feed streams, a 2.6% strength aqueous solution of t-butyl hydroperoxide and a 4.5% strength aqueous sodium formaldehydesulfoxylate solution, were fed in simultaneously with the monomer feed stream. The monomer solution consisted of 4563 g of vinyl chloride, 1950 g of vinyl acetate and 200 g of glycidyl acrylate. After the reaction had started, a solution of 667 g of polyvinyl alcohol having a Höppler viscosity of 4 mPas (4% strength solution in water at 20° C.) and a saponification number of 140 in 3937 g of water was metered in over a period of from 6 to 7 hours. The period over which the monomer mixture was metered in was 8h. After the metering-in was complete, polymerization was continued for another 2 hours. The solids content was 50.2%. The Tg of the polymer was 13.5° C.

Before spray drying, 7.0% by weight, based on polymer, of a polyvinyl alcohol containing 1% by weight of crotonic acid units and having a saponification number of 80 and a Höppler viscosity of 7 was added in the form of an 18% strength aqueous solution. Drying was carried out as in Example 1 in a Nubilosa spray dryer.

EXAMPLE 3

Polymerization and spraying were carried out using a method similar to Example 1, except that the 120 g of glycidyl methacrylate were replaced by 120 g of allyl acetoacetate. The dispersion obtained in this way had a solids content of 50.3%. The polymer had a K value of 82.9, a $T_g$ of 1° C. and an MFT of 0° C.

Before spraying, 8.5% by weight, based on polymer, of a polyvinyl alcohol containing 1% by weight of crotonic acid units and having a saponification number of 80 and a Höppler viscosity of 7 was added in the form of an 18% strength aqueous solution. Drying was carried out using a method similar to Example 1.

EXAMPLE 4

A solution of 77.5 g of polyvinyl alcohol having a Höppler viscosity of 4 mPas (4% strength aqueous solution in water at 20° C.) and a saponification number of 140 in 706 g of water was placed in a 2.5 l stirred vessel and 120.6 g of a 1:1 mixture (w/w) of styrene and butyl acrylate were preemulsified therein. After heating the emulsion to 50° C., a 4.9% strength aqueous t-butyl hydroperoxide solution, an 8.3% strength aqueous ascorbic acid solution and 406 g of a 1:1 mixture (w/w) of styrene and butyl acrylate in which 23.5 g of isopropenyldimethylbenzyl isocyanate had been dissolved were fed in simultaneously. After 2 hours, the metered addition of monomer was complete. Further polymerization was carried out using a 10% strength $H_2O_2$ solution. The dispersion had a solids content of 50.4% and a pH of 5.0.

The addition of polyvinyl alcohol and spraying were carried out using a method similar to Example 1.

EXAMPLE 5

3700 g of an 18% strength solution of a polyvinyl alcohol containing 1% by weight of crotonic acid units and having a saponification number of 80 and a Höppler viscosity of 7, 2270 g of water and 769 g of vinyl acetate were placed in a 16 l stirring autoclave, 1350 g of ethylene were injected and the mixture was heated to 50° C., resulting in a pressure rise to 55 bar. The catalyst solutions, viz. a 5.5% strength aqueous sodium persulfate solution and a 3.9% strength Brüggolit solution, were then fed in. After the reaction had started, metering in of the vinyl acetate (5190 g) was commenced. The duration of the measured addition was 4 hours. After the metered addition had been concluded, polymerization was continued for 1 hour. The dispersion had a solids content of 51.3%. The polymer had a K value of 146 and an MFT of <0° C.

Before spraying, 5% by weight, based on polymer, of a low-viscosity gelatin was added in the form of an aqueous solution. The solids content of the mixture to be sprayed was 37%. Spraying was carried out using a method similar to Example 1.

EXAMPLE 6

A pressure autoclave having a capacity of 17 l was charged with 2100 g of water and 138 g of polyvinyl alcohol having a Höppler viscosity of 4 mPas (4% strength solution in water at 20° C.) and a saponification number of 140. The autoclave was heated to 60° C. and ethylene was injected to a pressure of 75 bar. This pressure was maintained during the entire time over which the monomers were metered in. The catalyst feed streams, viz. a 5% strength aqueous solution of t-butyl hydroperoxide and a 5% strength aqueous sodium formaldehydesulfoxylate solution, were fed in simultaneously with the monomer feed stream. The monomer feed stream consisted of 5874 g of vinyl chloride and 1031 g of vinyl acetate. After the reaction had started, a solution of 358 g of polyvinyl alcohol having a Höppler viscosity of 4 mPas (4% strength solution in water at 20° C.) and a saponification number of 140 in 5417 g of water and a solution of 304 g of a polyvinyl alcohol containing 1% by weight of crotonic acid units in 3861 g of water were metered in over a period of 7 hours. A preemulsion comprising 138 g of glycidyl methacrylate, 358 g of polyvinyl alcohol having a Höppler viscosity of 4 mPas (4% strength solution in water at 20° C.) and a saponification number of 140 and 69 g of water was metered in simultaneously. After conclusion of the metered additions, polymerization was continued for 2 hours.

Drying was carried out as in Example 1 in a Nubilosa spray dryer.

The powders from Examples 1 to 6 were mixed with the type and amount of phase transfer catalyst indicated in the Table and redispersed to form a 50% strength aqueous dispersion. A 0.2 mm thick film was produced from this and was dried for 12 hours at room temperature or 15 minutes at 110° C.

Films produced similarly from redispersed powders but without addition of phase transfer catalyst were used for comparison.

Phase transfer catalysts used were:
tetrabutylammonium chloride (TBACl),
benzyltrimethylammonium hydrogen sulfate (BTMAHS),
crown ether 18-crown-6 and
crown ether Kryptofix-2.2.2.
Redispersibility of the films:

To determine the degree of crosslinking of the films, a drop of water was applied to each of the films produced using the redispersion and the redispersibility of the films was determined after 60 seconds by rubbing with the fingertip.
Evaluation of the film redispersibility:
Grade 1: very readily redispersible
Film can be redispersed immediately by very light rubbing or redisperses spontaneously.
Grade 2: readily redispersible
Film can be readily dispersed by rubbing; pieces of film are possible, but are few and very easily redispersible between the fingers.
Grade 3: somewhat redispersible
Film can be redispersed only by vigorous rubbing; substrate is reached only slowly with destruction of film (pieces of film); pieces of film not redispersible.
Grade 4: not redispersible
Film cannot be redispersed even by prolonged vigorous rubbing; film breaks up into pieces of film without redispersing or becomes detached from the substrate.

The results of testing are summarized in the Table below:

TABLE 1

| Expt. No. | Powder type | Catalyst Type | %[1] | Redispersibility Film dried at 23° C. | Film dried at 110° C. |
|---|---|---|---|---|---|
| 1 | Example 1 | — | — | 1 | 1–2 |
| 2 | Example 2 | TBACl | 0.2 | 4 | 4 |
| 3 | Example 2 | — | — | 1 | 1–2 |
| 4 | Example 2 | BTMAHS | 0.2 | 4 | 4 |

TABLE 1-continued

| Expt. No. | Powder type | Catalyst Type | % [1] | Redispersibility Film dried at 23° C. | Film dried at 110° C. |
|---|---|---|---|---|---|
| 5 | Example 3 | — | | 1–2 | 1–2 |
| 6 | Example 3 | TBAC1 | 0.3 | 3 | 3–4 |
| 7 | Example 4 | — | | 1 | 1–2 |
| 8 | Example 4 | TBAC1 | 0.2 | 4 | 1–2 |
| 9 | Example 5 | — | | 1–2 | 2 |
| 10 | Example 5 | TBAC1 | 0.3 | 3–4 | 4 |
| 11 | Example 6 | — | | 1 | 1–2 |
| 12 | Example 6 | TBAC1 | 0.5 | 3–4 | 4 |
| 13 | Example 1 | 18-crown-6 | 0.3 | 3 | 3–4 |
| 14 | Example 1 | Kryptofix[2] | | 4 | 4 |

[1] % by weight based on powder
[2] dissolved in isopropanol; gel formation on addition

What is claimed is:

1. A crosslinkable powder composition which is redispersible in water and consists essentially of
   (a) from 30 to 95 parts by weight of a water-insoluble, film-forming polymer of at least one free-radically polymerizable, ethylenically unsaturated monomer selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes, olefins, vinylaromatics and vinyl halides,
   (b) from 5 to 70 parts by weight of a water-soluble polymer selected from the group consisting of polyvinyl alcohols comprising from 75 to 100 mol %, of vinyl alcohol units and having a molecular weight of from 5000 to 200000; polyvinylpyrrolidones having a K value of from 10 to 120; polysaccharides in water-soluble form, celluloses and their carboxymethyl, methyl, hydroxyethyl and hydroxypropyl derivatives, casein, soya protein, gelatin, lignosulfonates, poly(meth)acrylic acid, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers, and wherein the water soluble polymers may be functionalized with hydroxyl groups, mercapto groups, carboxyl groups, amino groups or carbonyl groups, where at least one of the polymer components a) and b) comprises one or more comonomer units containing reactive groups which can form a chemical, nonionic bond with one another or with crosslinkers, and the parts by weight of a) and b) add up to 100 parts by weight, and
   (c) from 0.01 to %% by weight, based on the total weight of a) and b), of at least one phase transfer catalyst selected from the group consisting of quaternary ammonium salts, quaternary phosphonium salts, quaternary pyridinium salts, crown ethers, and tertiary diamines or oligoamines suitable for complex formation.

2. A crosslinkable powder composition which is redispersible in water as claimed in claim 1, wherein polymer a) comprises one or more crosslinkable monomer units selected from the group consisting of monomers containing alkoxysilane, epoxide, isocyanate, amido, hydroxy, carboxyl, sulfonic acid, carbonyl, amino or hydrazide groups.

3. A crosslinkable powder composition which is redispersible in water as claimed in claim 1, wherein polymer b) is a water-soluble protective colloid which may be functionalized with hydroxyl groups, mercapto groups, carboxyl groups, amine groups or carbonyl groups.

4. A crosslinkable powder composition which is redispersible in water as claimed in claim 1, comprising one or more crosslinkers selected from the group consisting of diamines, oligoamines and polyamines, dicarboxylic, oligocarboxylic and polycarboxylic acids, compounds containing two or more alcohol groups, compounds containing two or more silanol or alkoxysilane groups, diisocyanates, oligoisocyanates or polyisocyanates, and polyvalent metal ions, and compounds containing 2 or more epoxide, aldehyde, keto or reactive CH groups.

* * * * *